US008660318B2

(12) United States Patent
Komura et al.

(10) Patent No.: US 8,660,318 B2
(45) Date of Patent: Feb. 25, 2014

(54) LIVING BODY INFORMATION REGISTRATION METHOD, BIOMETRICS AUTHENTICATION METHOD, AND BIOMETRICS AUTHENTICATION APPARATUS

(75) Inventors: Kazuhiro Komura, Inagi (JP); Hiroyuki Takamatsu, Inagi (JP)

(73) Assignee: Fujitsu Frontech Limited, Tokyo (JP)

( * ) Notice: Subject to any disclaimer, the term of this patent is extended or adjusted under 35 U.S.C. 154(b) by 21 days.

(21) Appl. No.: 13/448,872

(22) Filed: Apr. 17, 2012

(65) Prior Publication Data

US 2012/0201431 A1    Aug. 9, 2012

Related U.S. Application Data

(63) Continuation of application No. PCT/JP2009/068728, filed on Oct. 30, 2009.

(51) Int. Cl.
*G06K 9/00*      (2006.01)
(52) U.S. Cl.
USPC ........................................................... 382/115
(58) Field of Classification Search
None
See application file for complete search history.

(56) References Cited

U.S. PATENT DOCUMENTS

| | | | |
|---|---|---|---|
| 6,950,536 B2 * | 9/2005 | Houvener | 382/116 |
| 2007/0177767 A1 | 8/2007 | Miura et al. | |
| 2007/0217660 A1 * | 9/2007 | Komura et al. | 382/115 |
| 2008/0316323 A1 * | 12/2008 | Morita et al. | 348/222.1 |

FOREIGN PATENT DOCUMENTS

| | | |
|---|---|---|
| EP | 1 816 587 A1 | 8/2007 |
| EP | 1 835 443 A1 | 9/2007 |
| GB | 2 108 306 A | 5/1983 |
| JP | 54-105929 A | 8/1979 |
| JP | 58-066176 A | 4/1983 |
| JP | 10-334237 A | 12/1998 |
| JP | 2001-243465 A | 9/2001 |
| JP | 2006-277407 A | 10/2006 |
| JP | 2007-206991 A | 8/2007 |
| JP | 2007-249339 A | 9/2007 |
| JP | 2009-086951 A | 4/2009 |

OTHER PUBLICATIONS

ISR of PCT/JP2009/068728, maling date of Nov. 24, 2009.

* cited by examiner

*Primary Examiner* — Bhavesh Mehta
*Assistant Examiner* — Siamak Harandi
(74) *Attorney, Agent, or Firm* — Westerman, Hattori, Daniels & Adrian, LLP

(57) ABSTRACT

A vein authentication apparatus registers vein data and vein characteristic amounts, determines comparison order at vein data identification time by sorting records in descending order of degree of similarity on the basis of vein characteristic amounts for comparison and the registered vein characteristic amounts, and makes vein data comparison in accordance with the comparison order. The vein authentication apparatus uses 32 frequencies obtained by performing a Fourier transform, 12 angles obtained by performing a Fourier transform, curvature directions in 36 angle areas, segment directions in 18 angle areas, and a vein amount as the vein characteristic amounts. By doing so, the accuracy of comparison order is improved and a comparison using a record for which a degree of similarity is low can be omitted. As a result, the speed of a comparison process and the maximum number of pieces of living body information which can be registered can be increased.

11 Claims, 18 Drawing Sheets

CAPTURED IMAGE

FIG. 5

| <VEIN DATABASE> | | |
|---|---|---|
| RECORD 1 | | |
| | ID: "ID000001" | |
| | FIRST VEIN CHARACTERISTIC AMOUNT | 32 FREQUENCIES OBTAINED BY PERFORMING FOURIER TRANSFORM (Index1[0],Index1[1],...,Index1[31]) |
| | SECOND VEIN CHARACTERISTIC AMOUNT | 12 ANGLES OBTAINED BY PERFORMING FOURIER TRANSFORM (Index2[0],Index2[1],...,Index2[11]) |
| | THIRD VEIN CHARACTERISTIC AMOUNT | CURVATURE DIRECTIONS IN 36 ANGLE AREAS BASED ON 6-AREA DIVISION PATTERN 1 (Index3_P1[0][0],Index3_P1[0][1],...,Index3_P1[5][35]) <br> CURVATURE DIRECTIONS IN 36 ANGLE AREAS BASED ON 6-AREA DIVISION PATTERN 2 (Index3_P2[0][0],Index3_P2[0][1],...,Index3_P2[5][35]) |
| | FOURTH VEIN CHARACTERISTIC AMOUNT | SEGMENT DIRECTIONS IN 18 ANGLE AREAS BASED ON 6-AREA DIVISION PATTERN 1 (Index4_P1[0][0],Index4_P1[0][1],...,Index4_P1[5][17]) <br> SEGMENT DIRECTIONS IN 18 ANGLE AREAS BASED ON 6-AREA DIVISION PATTERN 2 (Index4_P2[0][0],Index4_P2[0][1],...,Index4_P2[5][17]) |
| | FIFTH VEIN CHARACTERISTIC AMOUNT | VEIN AMOUNT BASED ON 49-AREA DIVISION PATTERN (Index5_P1[0],Index5_P1[1],...,Index5_P1[48]) <br> VEIN AMOUNT BASED ON 64-AREA DIVISION PATTERN (Index5_P2[0],Index5_P2[1],...,Index5_P2[63]) |
| | VEIN DATA | N-BYTE DATA |
| RECORD 2 | | |
| ... | | |
| RECORD N | | |

VEIN DATA FOR COMPARISON

|   | 0 | 1 | 2 | 3 | 4 |
|---|---|---|---|---|---|
| 0 | 255 | 255 | 0 | 255 | 255 |
| 1 | 255 | 255 | 0 | 0 | 0 |
| 2 | 255 | 255 | 0 | 255 | 0 |
| 3 | 0 | 0 | 255 | 0 | 0 |
| 4 | 0 | 0 | 0 | 255 | 0 |

REGISTERED VEIN DATA

|   | 0 | 1 | 2 | 3 | 4 |
|---|---|---|---|---|---|
| 0 | 255 | 255 | 0 | 0 | 255 |
| 1 | 255 | 255 | 255 | 0 | 0 |
| 2 | 255 | 255 | 0 | 255 | 255 |
| 3 | 0 | 0 | 255 | 0 | 0 |
| 4 | 0 | 0 | 0 | 255 | 255 |

SCHEMATIC VIEW OF p(r)

SCHEMATIC VIEW OF q($\theta$)

LIVING BODY INFORMATION REGISTRATION METHOD, BIOMETRICS AUTHENTICATION METHOD, AND BIOMETRICS AUTHENTICATION APPARATUS

CROSS-REFERENCE TO RELATED APPLICATION

This application is a continuing application, filed under 35 U.S.C. §111(a), of International Application PCT/JP2009/068728, filed on Oct. 30, 2009.

FIELD

The embodiments discussed herein are related to a living body information registration method, a biometrics authentication method, and a biometrics authentication apparatus and, more particularly, to a living body information registration method, a biometrics authentication method, and a biometrics authentication apparatus for performing personal authentication by extracting a human physical characteristic and comparing the human physical characteristic with many pieces of living body information registered in advance.

BACKGROUND

Biometrics authentication apparatus for performing personal authentication by the use of human physical characteristics are widely used in security systems in which entering and leaving a room are managed. Fingerprints, irises in pupils, palm or finger veins, voiceprints, features and the like are used as physical characteristics. Authentication performed by the use of these physical characteristics has been put to practical use. There are a large number of palm or finger veins. Their patterns are complex and do not change for life. In addition, they are organs in a body which are difficult to forge. Accordingly, among others palm or finger veins are suitable for personal authentication.

With vein authentication the characteristics of hemoglobin in each red blood cell included in blood are used. That is to say, hemoglobin in each red blood cell which runs through an artery is combined with oxygen and is oxyhemoglobin. In a vein this oxyhemoglobin changes to deoxyhemoglobin which is not combined with oxygen. It is a characteristic of the deoxyhemoglobin that the deoxyhemoglobin absorbs near-infrared rays with a wavelength close to 760 nm. Accordingly, if a palm is irradiated with near-infrared rays and an image is produced from light reflected therefrom, then the image in which vein portions are black is obtained. The reason for this is that the intensity of light reflected from the vein portions is low.

A biometrics authentication apparatus registers in advance an image obtained in this way in a living body information database as living body information. When authentication is necessary, the biometrics authentication apparatus compares an image newly captured with registered living body information and confirms the identity of a person. At this time the biometrics authentication apparatus compares the image newly captured with the registered living body information one by one. After the biometrics authentication apparatus finishes comparing the image newly captured with all of the registered living body information, the biometrics authentication apparatus confirms the identity of a person on the basis of whether a degree of similarity between the image newly captured and each piece of registered living body information is greater than or equal to a determined value.

The data amount of living body information, such as a captured image, is very large, so it takes a long time to perform a comparison process one by one. Time taken to confirm the identity of a person lengthens with an increase in the number of pieces of registered living body information. In order to reduce wait time before completion of authentication, it is necessary to limit the number of pieces of registered living body information. Furthermore, in order to increase the number of pieces of registered living body information, it is necessary to prepare a plurality of biometrics authentication apparatus in each of which the number of pieces of registered living body information is limited.

This is what is called a one-to-N authentication process. A biometrics authentication apparatus which performs a one-to-N authentication process, which can reduce comparison time, and which can increase the number of pieces of registered living body information was proposed (see, for example, Japanese Laid-open Patent Publication No. 2007-249339). With this biometrics authentication apparatus vein characteristic amounts which are generated from captured images and the data amount of which is small and vein data for the captured images are registered in advance. When the biometrics authentication apparatus makes comparison, the biometrics authentication apparatus first calculates scores indicative of rough degrees of similarity from vein characteristic amounts generated from a captured image and the registered vein characteristic amounts, and determines the order of comparison according to a result of sorting the scores. The biometrics authentication apparatus then treats only vein data which ranks high in the order of comparison as an object of comparison and performs a detailed comparison process. As a result, the biometrics authentication apparatus makes a time-consuming comparison not for all registered living body information but for only registered living body information narrowed down to some degree. This significantly reduces comparison time. This reduction in comparison time enables an increase in the maximum number N of pieces of living body information which can be registered. In addition, this biometrics authentication apparatus uses a frequency component indicative of whether vein patterns are sparse or dense, an angle component indicative of the direction of a vein pattern, and a curvature component indicative of the direction of a curvature of a vein pattern as vein characteristic amounts for narrowing down an object of comparison.

The above biometrics authentication apparatus determines the order of comparison on the basis of the three vein characteristic amounts. However, the accuracy of the vein characteristic amounts is low, so it is impossible to increase the probability that vein data for which a degree of similarity is high will rank high in the order of comparison. Accordingly, the maximum number of pieces of living body information which can be registered cannot be increased.

SUMMARY

According to an aspect, there is provided a living body information registration method executed by a computer. The method includes: extracting vein data and characteristic amounts from a captured image which is living body information; and registering the extracted vein data and the extracted characteristic amounts, the characteristic amounts including: a first vein characteristic amount which is a frequency component obtained by characterizing periodicity of veins by performing a Fourier transform on a vein image obtained by reducing the vein data; a second vein characteristic amount which is an angle component obtained by characterizing a direction of a vein by performing a Fourier transform on the vein image; a third vein characteristic amount which is a curvature direction component obtained by characterizing a direction of a curvature of a vein of the vein image; a fourth vein characteristic amount which is a segment direction component obtained by characterizing a direction of a vein segment obtained by dividing a vein of the vein image; and a fifth vein characteristic amount which is a vein amount obtained by characterizing an amount of veins included in the vein image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates the data structure of data stored in a vein database;

FIGS. 8A and 8B are views for describing a comparison process, FIG. 8A indicating vein data for comparison, FIG. 8B being an example of registered vein data;

DESCRIPTION OF EMBODIMENTS

Embodiments will now be described in detail with reference to the drawings with a case where a biometrics authentication apparatus for performing vein authentication is applied to an access control system as an example.

(Access Control System)

Figure 1:
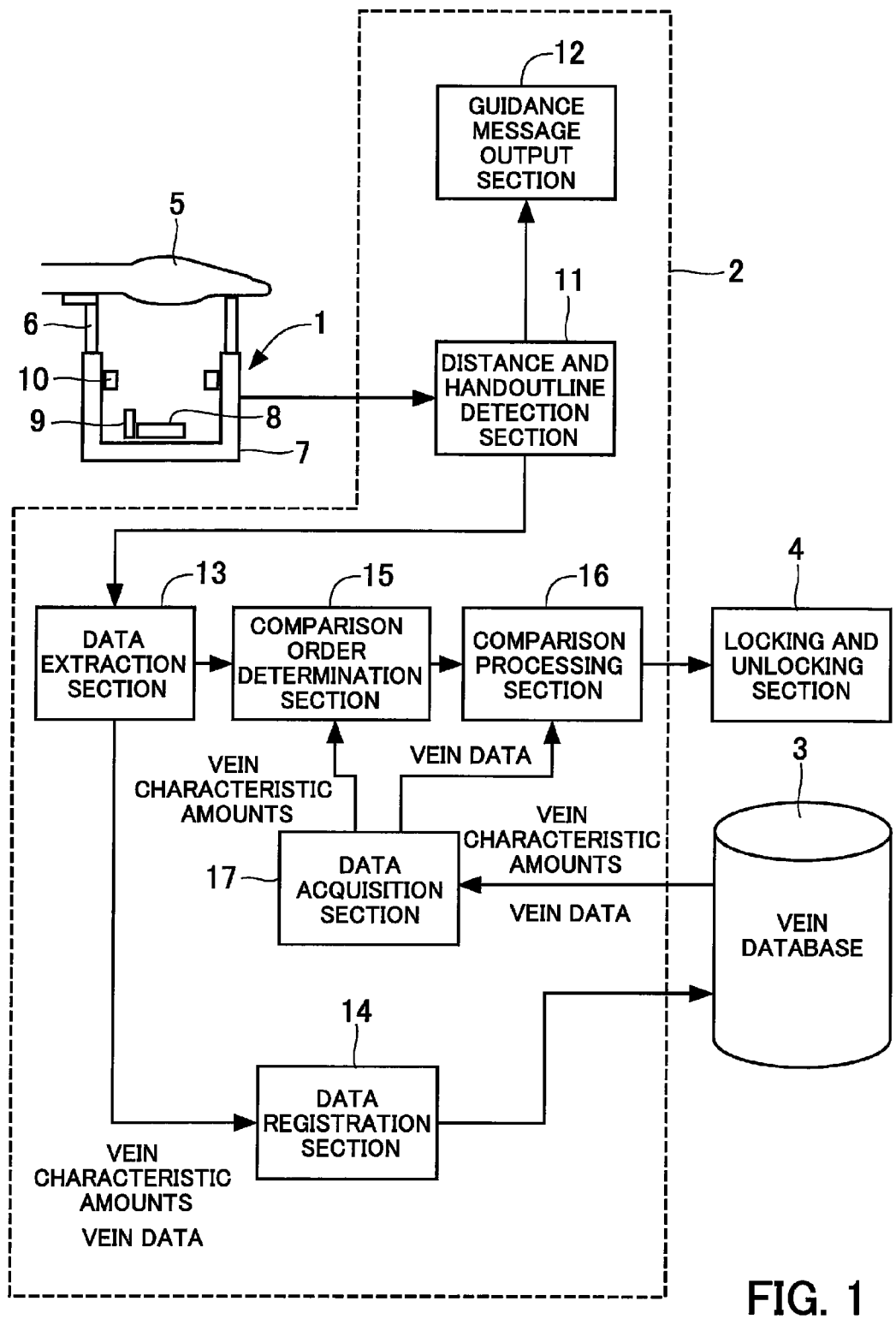
FIG. 1 is a block diagram of an access control system to which the present invention is applied.

FIG. 1 is a block diagram of an access control system to which the present invention is applied.

This access control system includes an imaging device 1 for capturing an image of palm veins, an authentication processing apparatus 2 for performing an authentication process on the basis of the captured image, a vein database 3 in which many pieces of vein data are registered, and a locking and unlocking section 4 which operates according to the result of processing by the authentication processing apparatus 2.

The imaging device 1 includes a guide 6 for supporting a hand 5 an image of which is to be captured. A sensor unit 7 is placed beneath the guide 6. An infrared sensor 8 which may be, for example, a CMOS (Complementary Metal Oxide Semiconductor) image sensor is placed in the center of the bottom of the sensor unit 7. A distance sensor 9 is placed by the side of the infrared sensor 8. A plurality of (eight, for example) near-infrared-emitting elements 10 which emit near-infrared rays in the upward direction in FIG. 1 are placed around the infrared sensor 8.

The authentication processing apparatus 2 includes a distance and hand outline detection section 11 which is connected to the output sides of the distance sensor 9 and the infrared sensor 8 of the imaging device 1 and which detects the distance between the infrared sensor 8 and the hand 5 and the outlines of the hand 5 and a guidance message output section 12 which outputs a guidance message. The distance and hand outline detection section 11 receives distance measured by the distance sensor 9 from the imaging device 1 and determines whether or not an object, such as a palm, is within a determined distance from the sensor unit 7. In addition, the distance and hand outline detection section 11 detects the outlines of the hand 5 from an image captured by the infrared sensor 8, and determines from the outlines whether or not the image can be used for a registration process and a comparison process.

If the distance and hand outline detection section 11 determines that the hand 5 or the like is outside an image capture area or that the captured image cannot be used for a registration process or a comparison process, then the guidance message output section 12 outputs a message for guiding the palm to a determined position to a display unit (not illustrated).

The authentication processing apparatus 2 also includes a data extraction section 13 which extracts vein data that is data regarding veins and vein characteristic amounts indicative of various characteristics of patterns of the veins on the basis of the captured image acquired from the distance and hand outline detection section 11. The output side of the data extraction section 13 is connected to a data registration section 14 which registers the extracted vein data and vein characteristic amounts in the vein database 3 and a comparison order determination section 15 which determines order of comparison. The output side of the comparison order determination section 15 is connected to a comparison processing section 16 which performs a comparison process and which outputs the result to the locking and unlocking section 4. The comparison order determination section 15 and the comparison processing section 16 are connected to a data acquisition section 17 to acquire registered vein characteristic amounts and vein data from the vein database 3.

A vein data registration process and a vein data identification process performed by the access control system having the above structure will now be described.

(Vein Data Registration Process)

Figure 2:
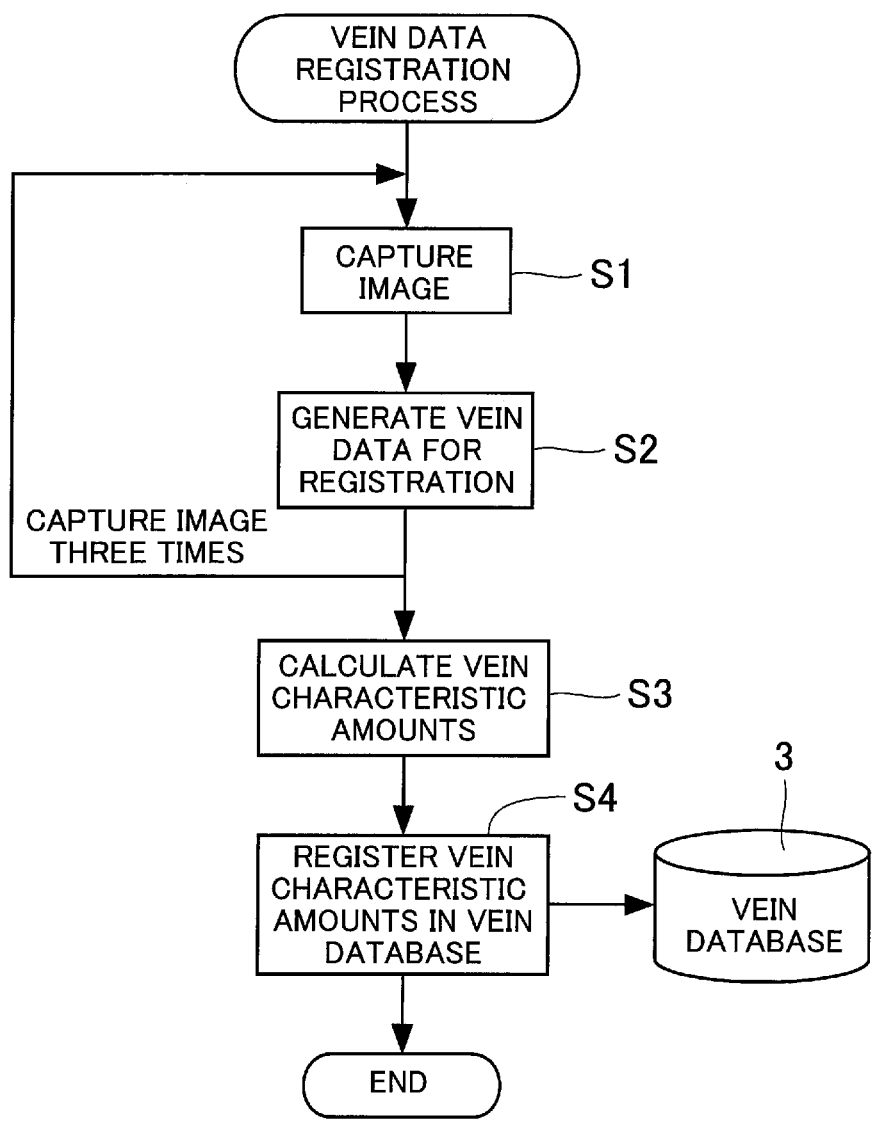
FIG. 2 is a flow chart of a procedure for a vein data registration process.
Figure 3:
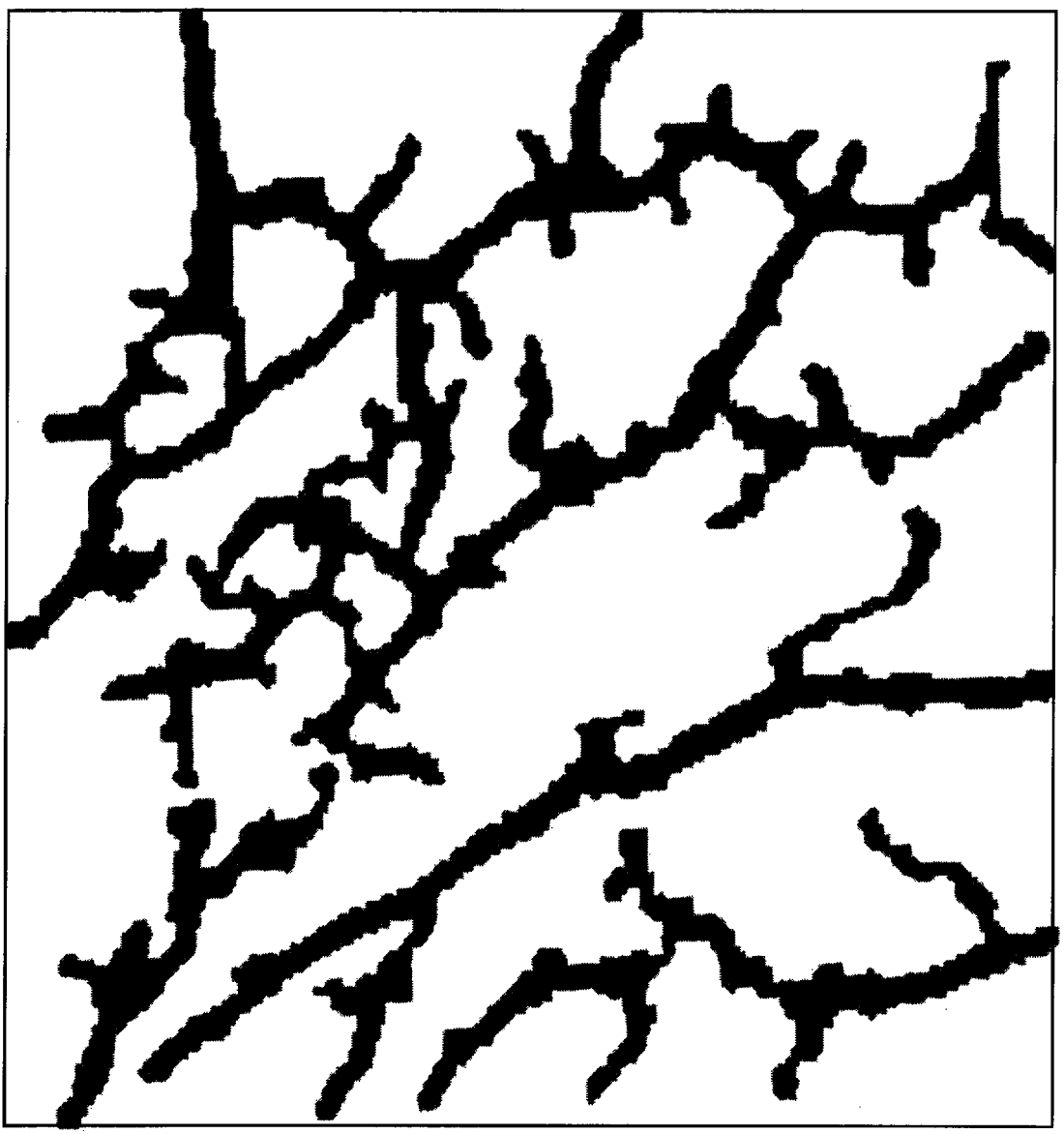
FIG. 3 is an example of a captured image of palm veins.
Figure 4:
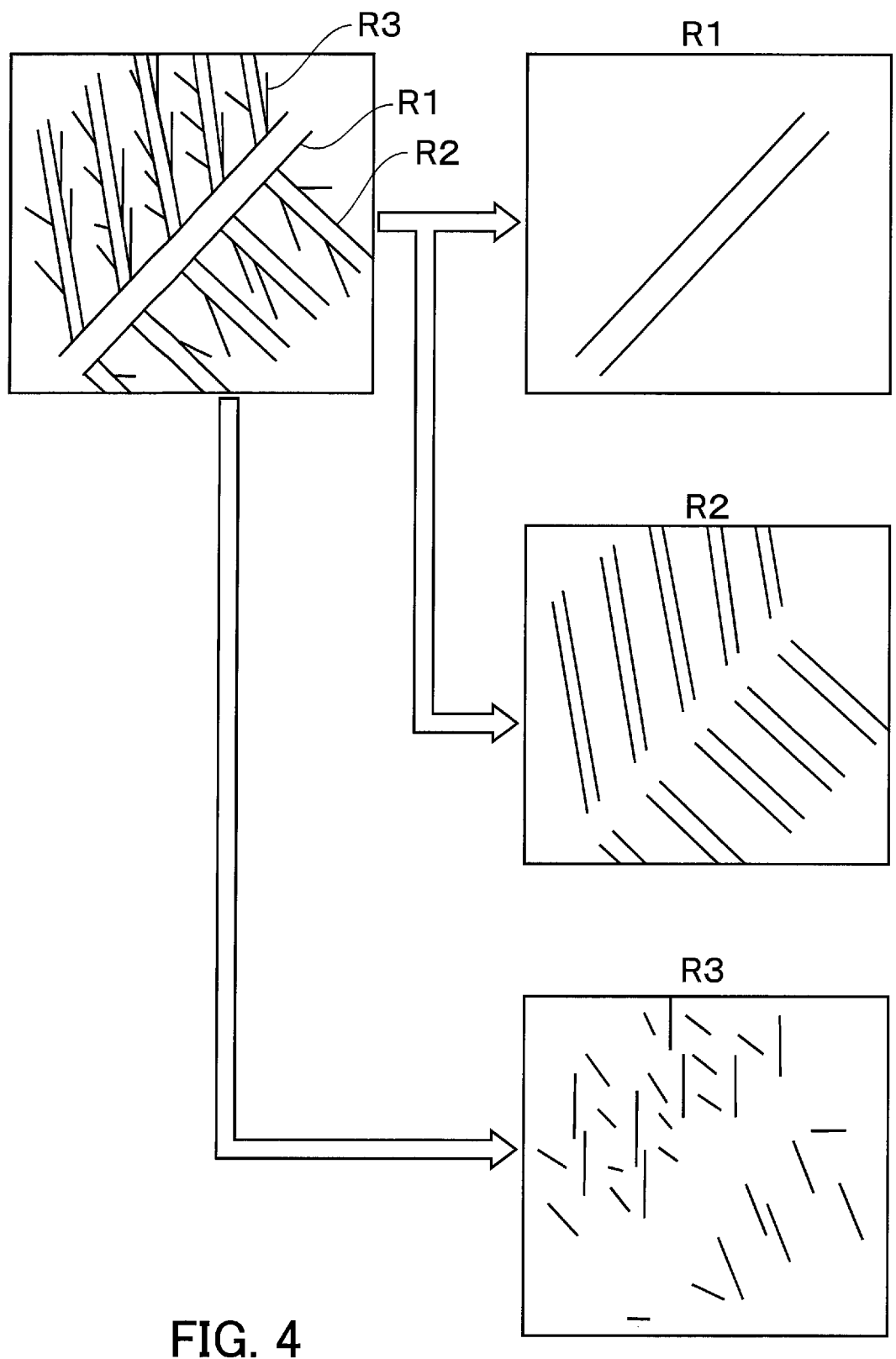
FIG. 4 is a schematic view of a state in which vein data is extracted from the captured image.
Figure 6:
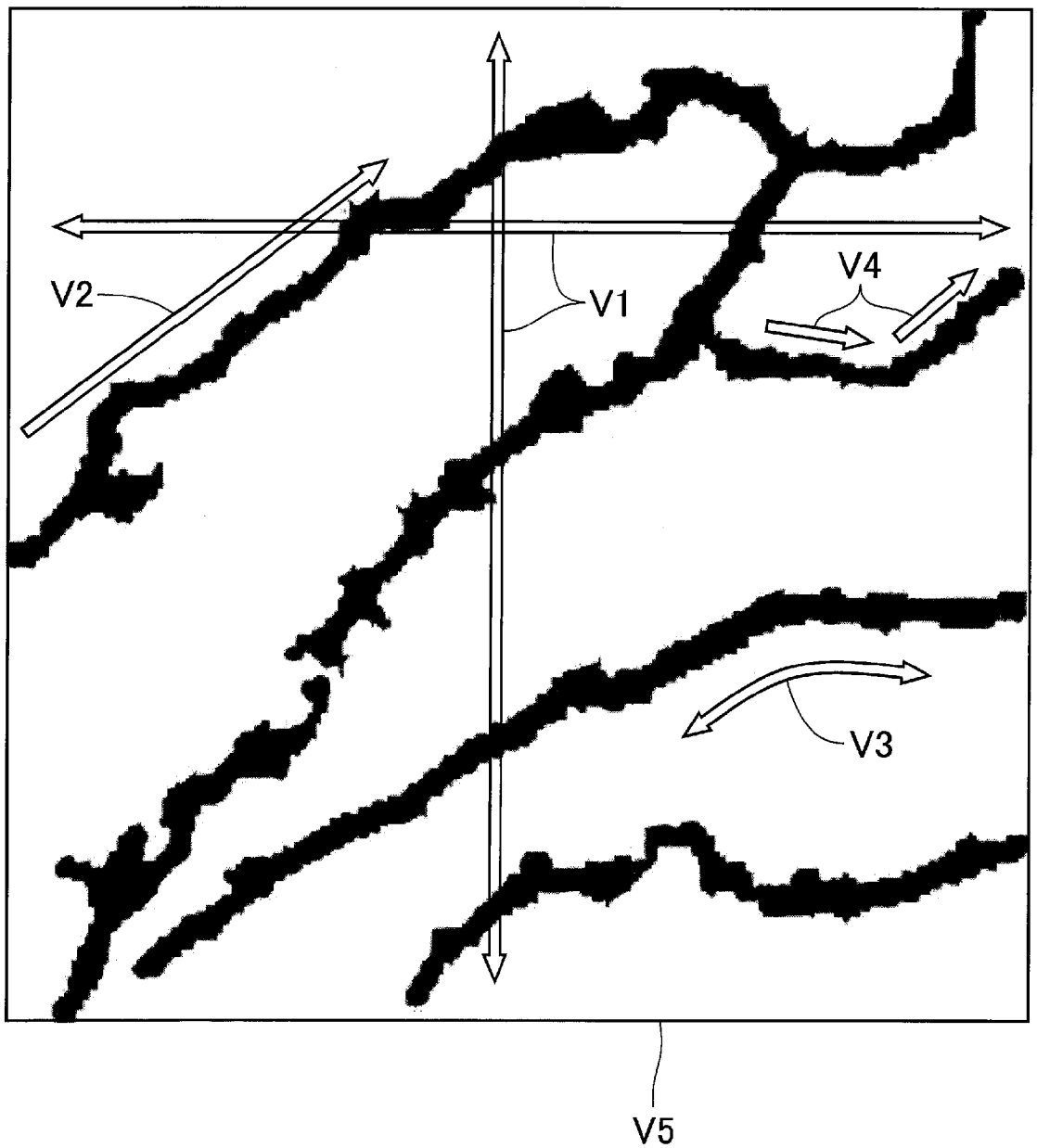
FIG. 6 is a schematic view for describing vein characteristic amounts extracted from the vein data.

FIG. 2 is a flow chart of a procedure for a vein data registration process. FIG. 3 is an example of a captured image of palm veins. FIG. 4 is a schematic view of a state in which vein data is extracted from the captured image. FIG. 5 illustrates the data structure of data stored in a vein database. FIG. 6 is a schematic view for describing vein characteristic amounts extracted from the vein data.

In a vein data registration process, as indicated in FIG. 2, first a user puts his/her hand on the imaging device 1. By doing so, the imaging device 1 captures an image of palm veins (step S1). Vein portions absorb near-infrared rays emitted from the near-infrared-emitting elements 10. Therefore, as illustrated in FIG. 3, vein blood vessels look like black patterns in the image of the palm veins captured by the imaging device 1.

The image captured in this way is inputted to the data extraction section 13 and vein data is generated by the data extraction section 13 (step S2). As illustrated in FIG. 4, the vein data can be classified into trunks R1, boughs R2, and twigs R3 connected to the boughs R2. The data extraction section 13 classifies the vein data into the trunks R1, the boughs R2, and the twigs R3.

The above capture of an image of the palm veins (step S1) and the above generation of vein data (step S2) are repeated plural times. In this embodiment they are repeated three times. Accordingly, vein data is obtained by performing steps S1 and S2 three times. The number of times steps S1 and S2 are repeated can be changed by setting. The vein data generated by the data extraction section 13 is to be registered in the vein database 3.

The data extraction section 13 then calculates five kinds of vein characteristic amounts which are less apt to be influenced by image capture situations, that is to say, first through fifth vein characteristic amounts V1 through V5 schematically indicated in FIG. 6 from the vein data other than, for example, the twigs R3 and a part of the trunks R1 (step S3).

The first vein characteristic amount V1 is a frequency component indicative of the distance between trunks R1 and between boughs R2 and the number of the trunks R1 and the boughs R2 in an image of the veins. The second vein characteristic amount V2 is a distribution of direction components of the trunks R1 and the boughs R2 in the image of the veins. The third vein characteristic amount V3 is a distribution of curvature direction components of the trunks R1 and the boughs R2 in the image of the veins. The fourth vein characteristic amount V4 is a distribution of direction components of segments into which the trunks R1 and the boughs R2 in the image of the veins are divided in the longitudinal direction. The fifth vein characteristic amount V5 is a distribution of the amounts of the trunks R1 and the boughs R2 in areas into which the image of the veins is divided. The instability of an image capture state such as the rotation of the captured image or lack of a part of the image, the slope of a hand at image capture time, or the like has little influence on the extraction of these first through fifth vein characteristic amounts V1 through V5.

The first through fifth vein characteristic amounts V1 through V5 calculated in this way by the data extraction section 13 are registered in the vein database 3 by the data registration section 14 (step S4). The data structure of data registered in the vein database 3 is illustrated in FIG. 5. One record is assigned to each user. A user identification number (ID), the five kinds of vein characteristic amounts, and vein data for a captured image are stored in each record. In order to prevent loss of data on a border line between areas after division, each of the third through fifth vein characteristic amounts V3 through V5 is calculated by the use of two division patterns which differ in division position, and is stored. Vein data for all images of the veins captured three times is stored.

(Vein Data Identification Process)

Figure 7:
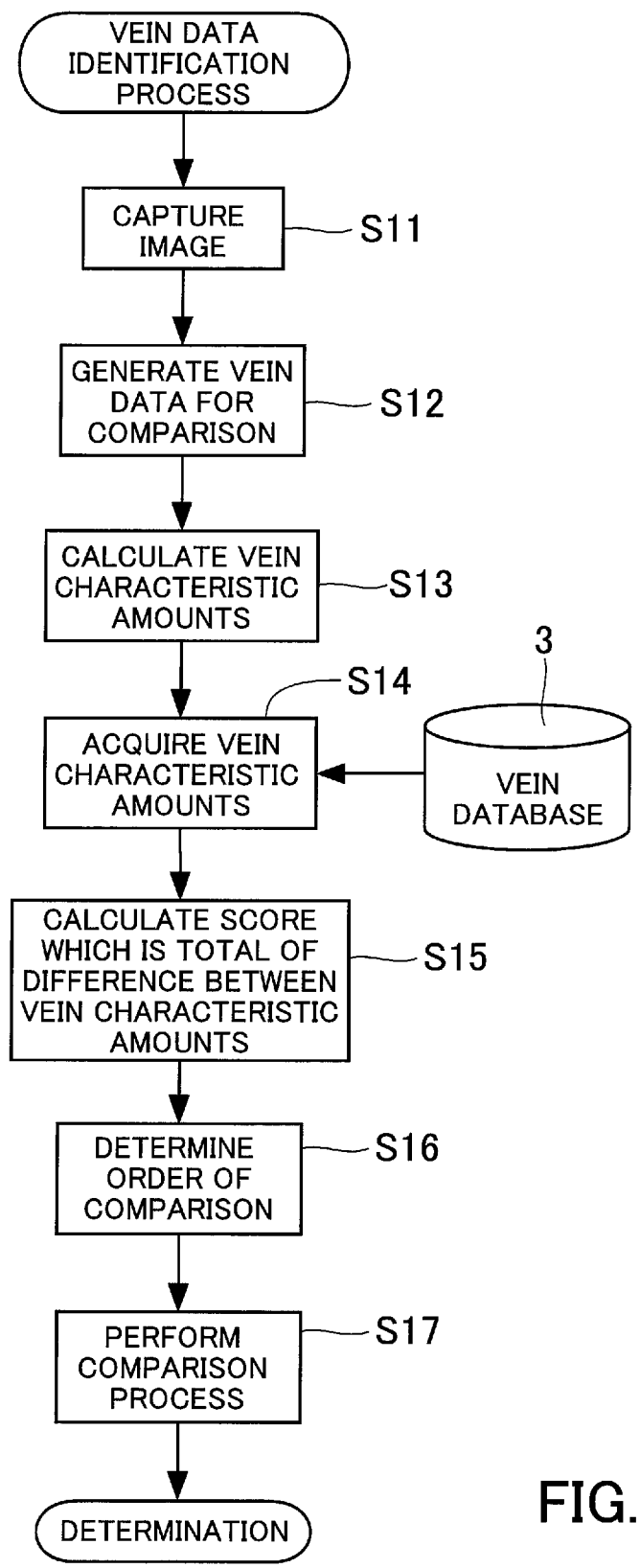
FIG. 7 is a flow chart of a procedure for a vein data identification process.

FIG. 7 is a flow chart of a procedure for a vein data identification process. FIGS. 8A and 8B are views for describing a comparison process. FIG. 8A indicates vein data for comparison. FIG. 8B is an example of registered vein data.

In a vein data identification process, as indicated in FIG. 7, first the imaging device 1 captures an image of a user's palm veins (step S11). The data extraction section 13 generates vein data (step S12) and calculates vein characteristic amounts (step S13). These steps S11 through S13 are the same with the vein data registration process. However, steps S11 through S13 differ from the vein data registration process in that image capture and vein data generation are performed once.

The data acquisition section 17 then acquires registered vein characteristic amounts from the vein database 3 (step S14). The acquired vein characteristic amounts are transmitted to the comparison order determination section 15. On the basis of the vein characteristic amounts calculated by the data extraction section 13 and the vein characteristic amounts acquired from the vein database 3, the comparison order determination section 15 calculates a score which is the total of the difference between them (step S15). On the basis of the score, the comparison order determination section 15 sorts records corresponding to a registered data group, and determines order of comparison (step S16).

The comparison processing section 16 then compares the vein data generated by the data extraction section 13 with the registered vein data acquired by the data acquisition section 17 in accordance with the order of comparison determined by the comparison order determination section 15 (step S17). At this time degrees of similarity are calculated in order for records in the top m percent of the order of comparison. If there is a record for which the degree of similarity is greater than or equal to a determined value, then the comparison processing section 16 determines that authentication has succeeded. That is to say, the identity of the user is confirmed. At this time the determination result is transmitted to the locking and unlocking section 4. The locking and unlocking section 4 opens an electric lock on a door and shuts it after a determined period of time.

If there are a plurality of records for which the degrees of similarity are greater than or equal to the determined value, then the comparison processing section 16 sorts the plurality of records on the basis of the degrees of similarity and determines that a record for which the degree of similarity is the highest is the user's record. As a result, the user is specified. If there is no record for which a degree of similarity is greater than or equal to the determined value, then the comparison processing section 16 informs the user by, for example, ringing a buzzer that the comparison processing section 16 has failed in authentication.

A method for calculating a degree of similarity will now be described. Vein data D1 and D2 indicated in FIGS. 8A and 8B are numerically expressed vein data for an image captured in the vein data identification process and numerically expressed registered vein data respectively. These vein data D1 and D2 are extremely simplified for the sake of explanation and are divided into fifths vertically and horizontally. That is to say, the vein data D1 and D2 are made up of twenty-five pixels. Each pixel has gray scale data represented by the intensity of a light reflected from a palm. Each pixel can hold a value between 0 and 255. However, the imaging device 1 performs a binarization process, so one of the two values 0 and 255 of the values 0 through 255 is assigned to each pixel. In this case, pixels which hold the value "0" indicate black portions in an image of veins and pixels which hold the value "255" indicate the other portions (white portions).

A degree of similarity is calculated in the following way. Twenty-five pixel values of the vein data D1 for comparison are compared with twenty-five pixel values of the registered vein data D2 one by one. The number of pixels at corresponding coordinates in the vein data D1 and D2 which hold the same value is counted. A count obtained is a degree of similarity. In the example of FIGS. 8A and 8B, if the twenty-five pixel values of the vein data D1 and D2 completely match and a count is "25", then a degree of similarity is "25". If the twenty-five pixel values of the vein data D1 and D2 do not match utterly and a count is "0", then a degree of similarity is "0". A pixel of the vein data D1 for the image captured is simply compared in this way with a corresponding pixel of the registered vein data D2, so processing can be performed at a high speed.

Calculation of a vein characteristic amount, calculation of a score based on a vein characteristic amount, and a comparison order determination process will now be described in detail. These are techniques for narrowing records for which a comparison is to be made as preprocessing for performing the above comparison process.

(Calculation of Vein Characteristic Amount)

Figure 9:
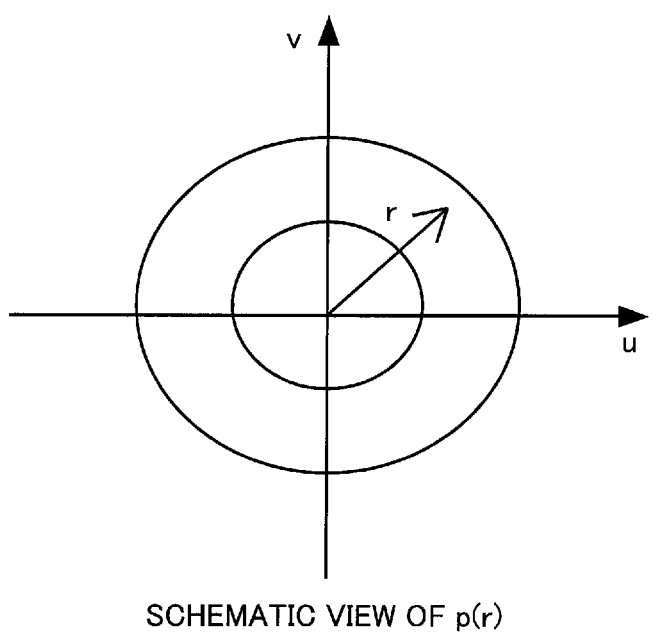
FIG. 9 is a schematic view for describing a frequency component which is a first vein characteristic amount.

FIG. 9 is a schematic view for describing a frequency component which is a first vein characteristic amount.

In order to calculate a first vein characteristic amount V1, first vein data other than twigs R3 and a part of trunks R1 is expanded in the center of an image which is, for example, 256×256 in size, the size of the image is reduced, and the image obtained is considered as a vein image f(x, y).

In order to find a spatial frequency component F(u, v), two-dimensional fast Fourier transform is then performed on the vein image f(x, y) by the use of $$F(u, v) = \frac{1}{MN} \sum_{m=0}^{M-1} \sum_{n=0}^{N-1} f(x, y) W_1^{mu} W_2^{nv} \quad (1)$$

where W1=exp(-j2π/M), W2=exp(-j2π/N), M is the number of pixels in a horizontal direction, and N is the number of pixels in a vertical direction. This two-dimensional fast Fourier transform is performed in the following way. First a Fourier transform is performed on pixels in each line in the x direction of the vein image f(x, y). A Fourier transform is then performed in the y direction on a result obtained by performing a Fourier transform in each line.

A power spectrum P(u, v) is then calculated from the spatial frequency component F(u, v) by the use of $$P(u, v)=|F(u, V)|^2 \quad (2)$$

After that, the power spectrum P(u, v) calculated in this way is expressed as power spectrum P(r, θ) in polar coordinates. Energy in a doughnut-shaped area the center of which is an origin is found by the use of $$p'(r) = \sum_{\theta=0}^{\pi} P(r, \theta) \quad (3)$$

where θ is in the range of 0 to π. The percentage of energy at each frequency is found from this p'(r) by the use of $$p(r)=10000*p'(r)/\Sigma p'(r) \quad (4)$$

where r is a radius, r=1 to 32, and 10000 is a correction value for conversion to an integer type.

As illustrated in FIG. 9, the first vein characteristic amount V1 is the sum of energy in the doughnut-shaped area in power spectrum space in a polar coordinate system the center of which is the origin. In this case, the radius r is changed from 1 to 32 and 32 frequencies are used as an index Index1 of the first vein characteristic amount V1. The index Index1 is calculated by the use of $$\text{Index1}[32]=\{p(1),p(2),\ldots,p(32)\} \quad (5)$$

Figure 10:
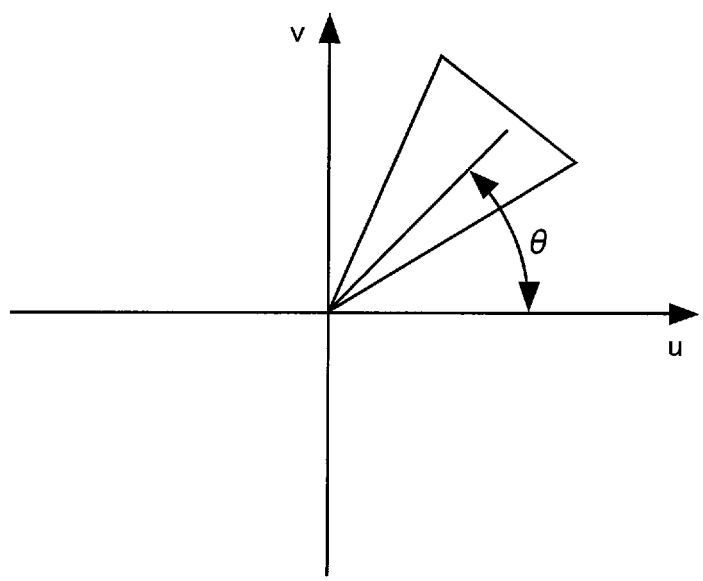
FIG. 10 is a schematic view for describing an angle component which is a second vein characteristic amount.

FIG. 10 is a schematic view for describing an angle component which is a second vein characteristic amount. In order to calculate a second vein characteristic amount V2, a Fourier transform is performed on the vein image f(x, y) to calculate the spatial frequency component F(u, v). The power spectrum P(u, v) is calculated from the spatial frequency component F(u, v). This is the same with the first vein characteristic amount V1.

The power spectrum P(u, v) is then expressed as power spectrum P(r, θ) in polar coordinates and energy at all angles is found by the use of $$q'(\theta) = \sum_{r=0}^{w/2} P(r, \theta) \quad (6)$$

where w is the magnitude of a domain of P(u, v) and θ indicates directions obtained by dividing 180 degrees into twelfths. The percentage of energy at each angle is found from this q'(θ) by the use of $$q(\theta)=10000*q'(\theta)/\Sigma q'(\theta) \quad (7)$$

where 10000 is a correction value for conversion to an integer type. That is to say, the percentage of energy in each angle range obtained by dividing 180 degrees into twelfths is calculated.

As illustrated in FIG. 10, the second vein characteristic amount V2 is the sum of energy in each angle range having an angle of 15 degrees. In this case, the angle θ is changed from 0 to 180 degrees and 12 angles are used as an index Index2 of the second vein characteristic amount V2. The index Index2 is calculated by the use of $$\text{Index2}[12]=\{q(0),q(1),\ldots,q(11)\} \quad (8)$$

A first angle component q(0) is energy in a range in which the angle θ is 0 to 14 degrees and is calculated by the use of $$q(0) = \sum_{\theta=0}^{14} q(\theta) \quad (9)$$

The value of the angle θ is then changed in turn to make calculations for the 12 directions.

Figure 11A:
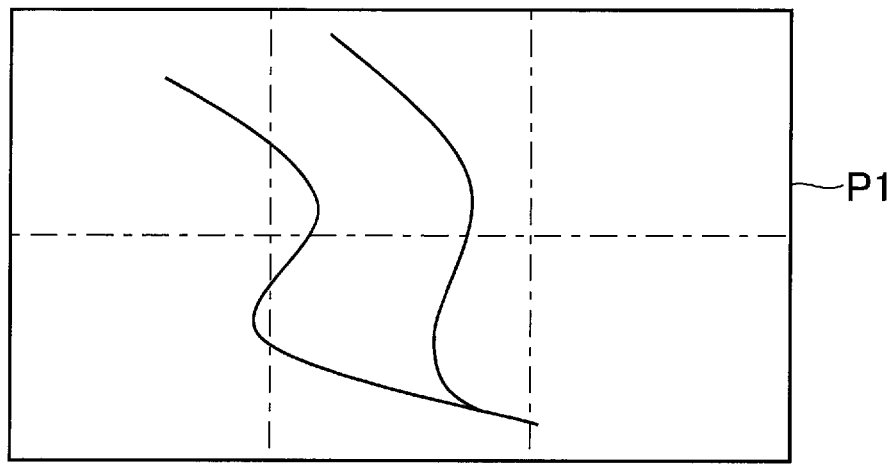
FIGS. 11A and 11B illustrate an area in which a third vein characteristic amount is calculated, FIG. 11A illustrating a first division pattern, FIG. 11B illustrating a second division pattern.
Figure 11B:
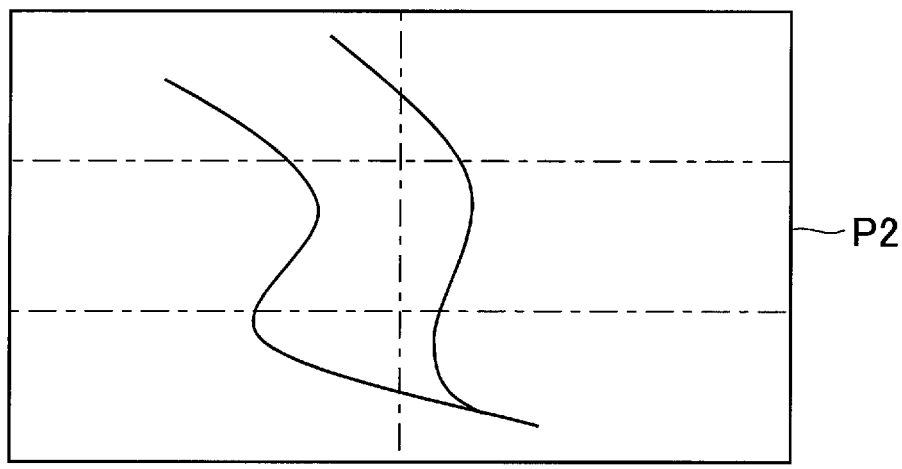
Figure 12:
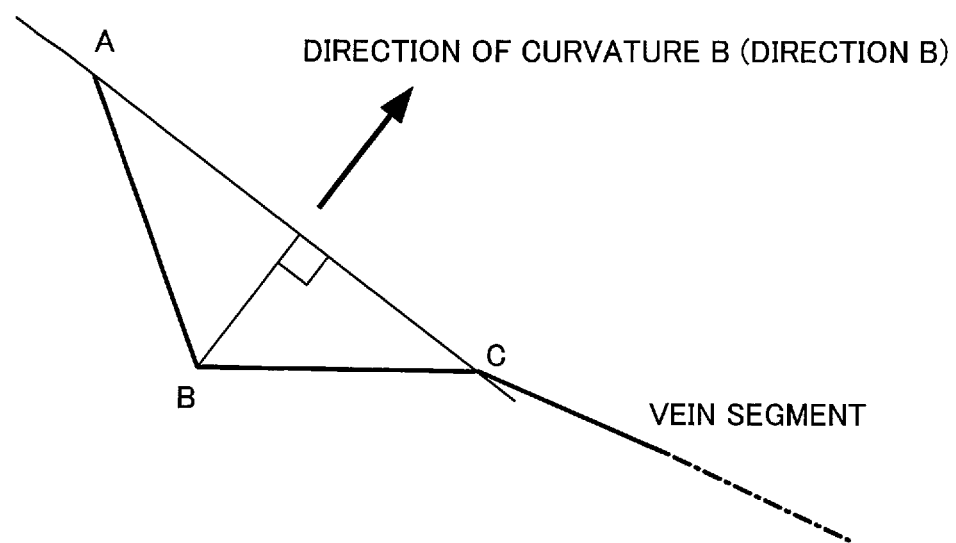
FIG. 12 is a view for describing a definition of a curvature direction.
Figure 13A:
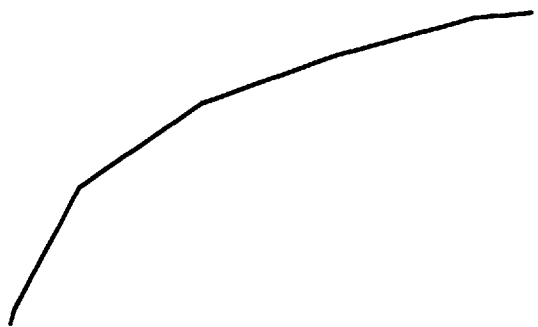
FIGS. 13A to 13C are views for describing a vein segment for which a curvature direction is calculated, FIG. 13A illustrating a vectorized vein segment, FIG. 13B indicating divided vein segments for which a curvature direction is calculated first, FIG. 13C indicating divided vein segments for which a curvature direction is calculated next.
Figure 13B:
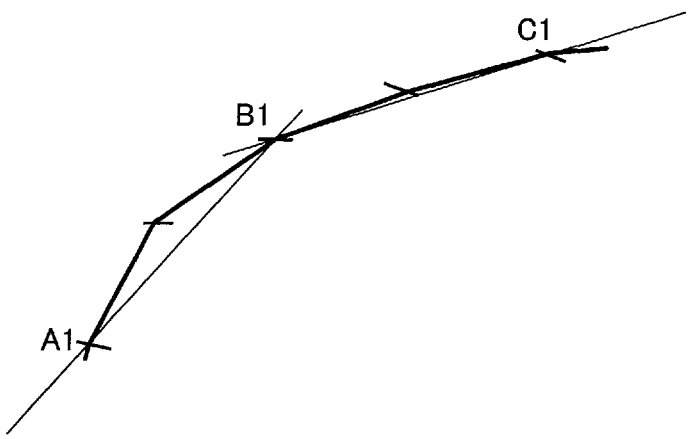
Figure 13C:
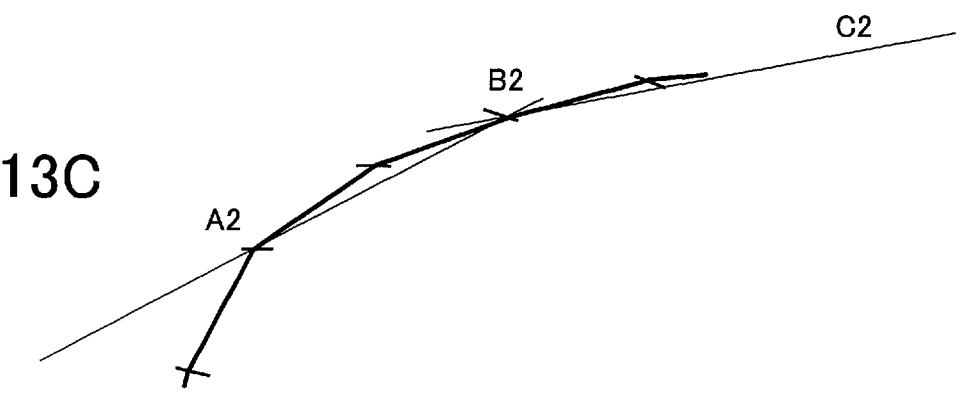

FIGS. 11A and 11B illustrate an area in which a third vein characteristic amount is calculated. FIG. 11A illustrates a first division pattern. FIG. 11B illustrates a second division pattern. FIG. 12 is a view for describing a definition of a curvature direction. FIGS. 13A to 13C are view for describing a vein segment for which a curvature direction is calculated. FIG. 13A illustrates a vectorized vein segment. FIG. 13B indicates divided vein segments for which a curvature direction is calculated first. FIG. 13C indicates divided vein segments for which a curvature direction is calculated next.

A third vein characteristic amount V3 is a direction (curvature direction) in which a vein of a vein image curves. The vein image is divided into several areas and a curvature direction component is calculated in each area.

As illustrated in FIGS. 11A and 11B, a vein image is divided into, for example, six areas. That is to say, with a first division pattern P1 illustrated in FIG. 11A, the vein image is divided into (2 rows×3 columns). With a second division pattern P2 illustrated in FIG. 11B, the vein image is divided into (3 rows×2 columns). A vein on a boundary line between areas obtained by dividing the vein image on the basis of the first division pattern P1 may not be recognized correctly. However, the vein is not on a boundary line between areas obtained by dividing the vein image on the basis of the second division pattern P2. Accordingly, the vein is recognized correctly. By using in this way the first division pattern P1 and the second division pattern P2 which differ in division position, lack of data can be complemented mutually.

A curvature direction of a vein is calculated in the following way. First vein data is vectorized, the curve-like vein is converted to a succession of thin straight lines which is referred to as a segment, and noise components are removed. Noise components include short isolated vein segments, twig vein segments, and vein segments which form circles.

A definition of a curvature direction is as follows. As illustrated in FIG. 12, it is assumed that there are two adjacent vectorized vein segments and that the coordinates of end points of the two adjacent vein segments are A, B, and C. A direction in which a perpendicular line is drawn from the vector point (bending point) B to a straight line AC which connects both ends of the two adjacent vein segments is defined as a curvature direction.

Next, in order to calculate a curvature direction, a continuous vein segment is divided, divided vein segments for which a curvature direction is to be calculated are determined, and the curvature direction for the divided vein segments determined is calculated.

That is to say, the coordinates of vector points on a vein segment illustrated in FIG. 13A are found. As illustrated in FIG. 13B, divided segments end points of which are a starting coordinate A1 of the vein segment, a coordinate B1 that is some distance away from the starting coordinate A1, and a coordinate C1 that is the same distance away from the coordinate B1 are then found. A curvature direction at the coordinate B1 is calculated from these divided segments. In this example, the coordinates of alternate vector points from the starting coordinate A1 of the vein segment are B1 and C1.

The coordinates A1, B1, and C1 are then shifted by one to set coordinates A2, B2, and C2 which are end points of divided vein segments for which a curvature direction is calculated next. A curvature direction at the coordinate B2 is calculated from these divided segments. Vector points are shifted in this way by one to determine end points of divided vein segments from which a curvature direction is calculated. This operation is performed in order until an ending coordinate of the vein segment is reached.

A method for calculating a curvature direction will now be described. It is assumed that there is a vein segment including three or more vector points and that end points of adjacent divided vein segments are A, B, and C. The angle of a direction B is calculated by the use of the following expressions (10), (11), and (12).

That is to say, it is assumed that when the points A, B, and C are translated so as to make the point B an origin, coordinates A', B', and C' after the translation are A'(xa, ya), B'(xb, yb), and C'(xc, yc). In addition, it is assumed that the coordinate of an intersection of the straight line AC and the perpendicular line drawn from the point B thereto is H(Hx, Hy). H(Hx, Hy) can be calculated by the use of:

$$Hx = -\frac{(xc*ya - xa*yc)}{(xc-xa)\wedge 2 + (yc-ya)\wedge 2} * (yc - ya) \quad (10)$$

$$Hy = \frac{(xc*ya - xa*yc)}{(xc-xa)\wedge 2 + (yc-ya)\wedge 2} * (xc - xa) \quad (11)$$

Accordingly, the angle of the direction B is calculated by the use of $$\text{direction } B = a\tan 2(Hy, Hx)*(180/\pi) \quad (12)$$

After all curvature directions are calculated in the above way, a histogram (curv[θ]) of curvature directions at vector points of all divided segments is drawn for each area obtained by dividing a vein image on the basis of the first division pattern P1 and the second division pattern P2. In this case, 36 angle areas are set by dividing 360 degrees by 10 degrees. When a curvature direction is calculated, a value corresponding to an angle area including the curvature direction is incremented. By doing so, a histogram (curv[θ]) of curvature directions is drawn. This histogram (curv[θ]) is used as an index preIndex3. For example, an index preIndex3 indicative of curvature directions in the 36 angle areas for a first area obtained by dividing the vein image on the basis of the first division pattern P1 is given by $$\text{preIndex3\_1}[0][36]=\{\text{curv}(0),\text{curv}(1),\ldots\text{curv}(35)\} \quad (13)$$

where curv(0), for example, indicates the total number of curvature directions included in the angle area of 0 to 9 degrees, and is calculated by the use of $$curv(0) = \sum_{\theta=0}^{10-1} curv(\theta) \quad (14)$$

Histograms are drawn in the same way for the other areas (preIndex[1] to preIndex[5]).

The sum total (Allcnt1) of the index preIndex3_1[m][n] (m=0 to 5, n=0 to 35) obtained in the above way is then found. Each component is divided by the sum total to calculate a percentage. By doing so, normalization is performed.

For example, an index indicative of curvature directions in the 36 angle areas for the first area obtained by dividing the vein image on the basis of the first division pattern P1 is given by Index3_P1[0][36]=preIndex3_1[0][0]/Allcnt1,preIndex3_1[0][1]/Allcnt1, . . . , preIndex3_1[0][35]/Allcnt1  (15)

An index indicative of curvature directions in the 36 angle areas for a second area obtained by dividing the vein image on the basis of the first division pattern P1 is given by Index3_P1[1][36]=preIndex3_1[1][0]/Allcnt1,preIndex3_1[1][1]/Allcnt1, . . . , preIndex3_1[1][35]/Allcnt1  (16)

Similarly, an index indicative of curvature directions in the 36 angle areas for a sixth area obtained by dividing the vein image on the basis of the first division pattern P1 is given by Index3_P1[5][36]=preIndex3_1[5][0]/Allcnt1,preIndex3_1[5][1]/Allcnt1, . . . , preIndex3_1[5][35]/Allcnt1  (17)

If the second division pattern P2 is used, the process of dividing a vein segment, calculating a curvature direction, and drawing a histogram of curvature directions is performed and the following normalization is performed. This is the same with the case where the first division pattern P1 is used.

In this case, it is assumed that the sum total of the index preIndex3_2[m] [n] (m=0 to 5, n=0 to 35) calculated by performing the above process is Allcnt2.

For example, an index indicative of curvature directions in the 36 angle areas for a first area obtained by dividing the vein image on the basis of the second division pattern P2 is given by Index3_*P*2[0][36]=preIndex3_2[0][0]/Allcnt2,preIndex3_2[0][1]/Allcnt2, . . . , preIndex3_2[0][35]/Allcnt2    (18)

An index indicative of curvature directions in the 36 angle areas for a second area obtained by dividing the vein image on the basis of the second division pattern P2 is given by Index3_*P*2[1][36]=preIndex3_2[1][0]/Allcnt2,preIndex3_2[1][1]/Allcnt2, . . . , preIndex3_2[1][35]/Allcnt2    (19)

Similarly, an index indicative of curvature directions in the 36 angle areas for a sixth area obtained by dividing the vein image on the basis of the second division pattern P2 is given by Index3_*P*2[5][36]=preIndex3_2[5][0]/Allcnt2,preIndex3_2[5][1]/Allcnt2, . . . , preIndex3_2[5][35]/Allcnt2    (20)

Figure 14:
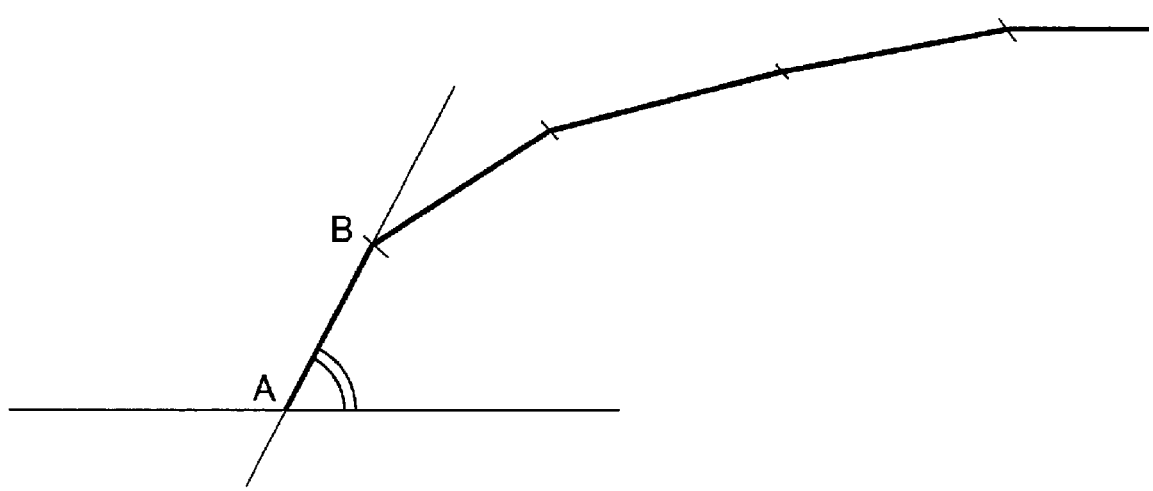
FIG. 14 is a view for describing a definition of a segment direction which is a fourth vein characteristic amount.
Figure 15A:
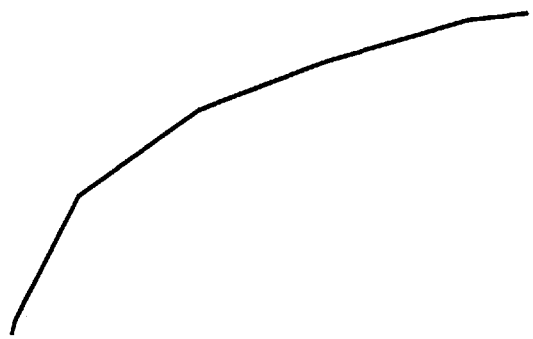
FIGS. 15A to 15C are views for describing a vein segment for which a segment direction is calculated, FIG. 15A illustrating a vectorized vein segment, FIG. 15B indicating divided vein segments for which a segment direction is calculated first, FIG. 15C indicating divided vein segments for which a segment direction is calculated next.
Figure 15B:
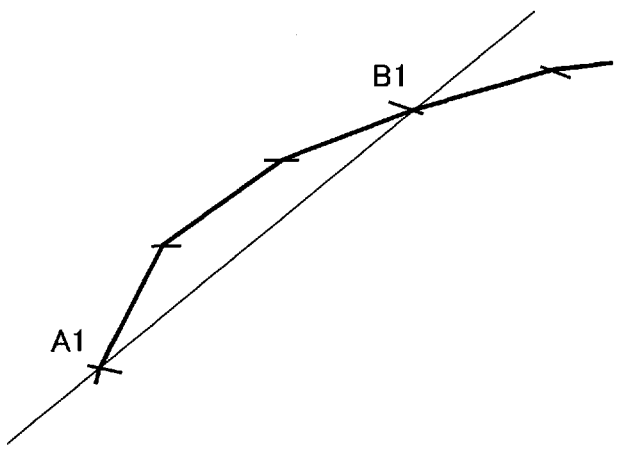
Figure 15C:
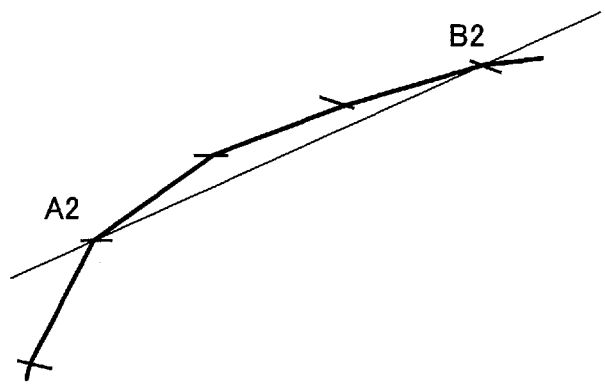

FIG. 14 is a view for describing a definition of a segment direction which is a fourth vein characteristic amount. FIGS. 15A to 15C are views for describing a vein segment for which a segment direction is calculated. FIG. 15A illustrates a vectorized vein segment. FIG. 15B indicates divided vein segments for which a segment direction is calculated first. FIG. 15C indicates divided vein segments for which a segment direction is calculated next.

A fourth vein characteristic amount V4 is the direction (slope) of a vein segment obtained by dividing a curve-like vein included in vein data. The vein image is divided into several areas and the direction of a vein segment is calculated for each area. This is the same with the case where the third vein characteristic amount is calculated. Division patterns used are the same as those indicated in FIGS. 11A and 11B. That is to say, two division patterns are used and a vein image is evenly divided into six areas on the basis of each division pattern. A histogram is drawn for each area.

A definition of a segment direction is as follows. As illustrated in FIG. 14, the slope of a straight line AB which connects two points at coordinates on a vectorized vein segment is defined as a segment direction.

Next, in order to calculate a segment direction, a continuous vein segment is divided, a divided vein segment for which a segment direction is to be calculated is determined, and the segment direction for the divided vein segment determined is calculated.

That is to say, the coordinates of vector points on a vein segment illustrated in FIG. 15A are found. As illustrated in FIG. 15B, a divided segment both ends of which are a starting coordinate A1 of the vein segment and a coordinate B1 that is some distance away from the starting coordinate A1 is then found. In this example, the coordinate of a fourth vector point from the starting coordinate A1 of the vein segment is B1. The length of a divided vein segment for finding a slope is determined on the basis of experimental results.

The coordinates of both ends of a next divided vein segment are A2 and B2 which are obtained by shifting the coordinates A1 and B1, respectively, by one. Coordinates are shifted in this way by one to determine a divided vein segment for which a segment direction is calculated. This operation is performed in order until an ending coordinate of the vein segment is reached.

A method for calculating the slope of a divided segment will now be described. It is assumed that the coordinates of both ends of a divided segment are A and B. An angle indicative of the slope of the divided segment is calculated by the use of the following expression (21).

That is to say, it is assumed that the coordinates A and B of both ends of the divided segment are A(xa, ya) and B(xb, yb) respectively. A segment direction can be calculated by the use of segment direction=$a \tan 2(yb-ya, xb-xa)*(180/\pi)$    (21)

However, if an angle is a negative value, then 180 degrees are added. If an angle is greater than or equal to 180 degrees, then 180 degrees are subtracted. The reason for this is that a slope of, for example, 270 or −90 degrees should be considered to be the same as a slope of 90 degrees.

After all segment directions are calculated in the above way, a histogram (segdir[θ]) of segment directions for all divided segments is drawn for each area obtained by dividing a vein image on the basis of the first division pattern P1 and the second division pattern P2. In this case, 18 angle areas are set by dividing 180 degrees by 10 degrees. When a segment direction is calculated, a value corresponding to an angle area including the segment direction is incremented. By doing so, a histogram (segdir[θ]) of segment directions is drawn. This histogram (segdir[θ]) is used as an index preIndex4. For example, an index preIndex4 indicative of segment directions in the 18 angle areas for a first area obtained by dividing the vein image on the basis of the first division pattern P1 is given by preIndex4_1[0][18]={segdir(0),segdir(2), . . . , segdir(17)}    (22)

where segdir(0), for example, indicates the total number of segment directions included in the angle area of 0 to 9 degrees, and is calculated by the use of $$segdir(0) = \sum_{\theta=0}^{10-1} segdir(\theta)$$    (23)

Histograms are drawn in the same way for the other areas (preIndex4_1 [1] to preIndex4_1 [5]).

The sum total (Allcnt1) of the index preIndex4_1 [m] [n] (m=0 to 5, n=0 to 17) obtained in the above way is then found. Each component is divided by the sum total to calculate a percentage. By doing so, normalization is performed.

For example, an index indicative of segment directions in the 18 angle areas for the first area obtained by dividing the vein image on the basis of the first division pattern P1 is given by Index4_*P*1[0][18]=preIndex4_1[0][0]/Allcnt1,preIndex4_1[0][1]/Allcnt1, . . . , preIndex4_1 [0][17]/Allcnt1    (24)

An index indicative of segment directions in the 18 angle areas for a second area obtained by dividing the vein image on the basis of the first division pattern P1 is given by Index4_*P*1[1][18]=preIndex4_1[1][0]/Allcnt1,preIndex4_1[1][1]/Allcnt1, . . . , preIndex4_1[1][17]/Allcnt1    (25)

Similarly, an index indicative of segment directions in the 18 angle areas for a sixth area obtained by dividing the vein image on the basis of the first division pattern P1 is given by Index4_*P*1[5][18]=preIndex4_1[5][0]/Allcnt1,preIndex4_1[5][1]/Allcnt1, . . . , preIndex4_1[5][17]/Allcnt1    (26)

If the second division pattern P2 is used, the process of dividing a vein segment, calculating the slope of a divided segment, and drawing a histogram is performed and the following normalization is performed. This is the same with the case where the first division pattern P1 is used. In this case, it is assumed that the sum total of the index preIndex4_2 [m] [n] (m=0 to 5, n=0 to 17) calculated by performing the above process is Allcnt2.

For example, an index indicative of segment directions in the 18 angle areas for a first area obtained by dividing the vein image on the basis of the second division pattern P2 is given by $$Index4\_P2[0][18]=preIndex4\_2[0][0]/Allcnt2, preIndex4\_2[0][1]/Allcnt2, \ldots, preIndex4\_2[0][17]/Allcnt2 \qquad (27)$$

An index indicative of segment directions in the 18 angle areas for a second area obtained by dividing the vein image on the basis of the second division pattern P2 is given by $$Index4\_P2[1][18]=preIndex4\_2[1][0]/Allcnt2, preIndex4\_2[1][1]/Allcnt2, \ldots, preIndex4\_2[1][17]/Allcnt2 \qquad (28)$$

Similarly, an index indicative of segment directions in the 18 angle areas for a sixth area obtained by dividing the vein image on the basis of the second division pattern P2 is given by $$Index4\_P2[5][18]=preIndex4\_2[5][0]/Allcnt2, preIndex4\_2[5][1]/Allcnt2, \ldots, preIndex4\_2[5][17]/Allcnt2 \qquad (29)$$

Figure 16A:
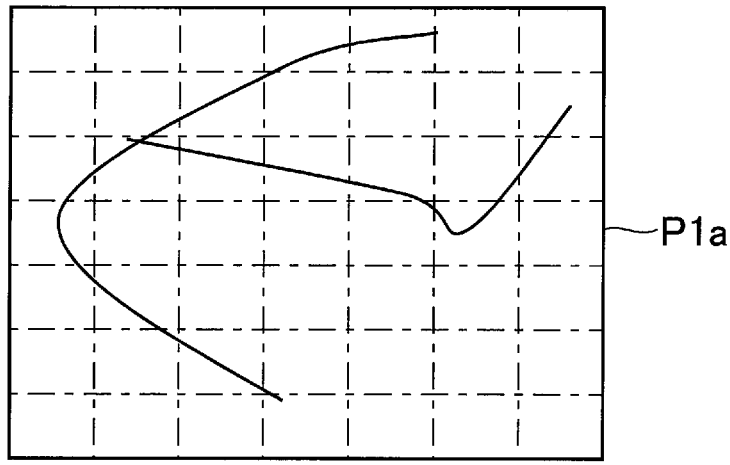
FIGS. 16A and 16B illustrate areas in which a fifth vein characteristic amount is calculated, FIG. 16A indicating a first division pattern, FIG. 16B illustrating a second division pattern.
Figure 16B:
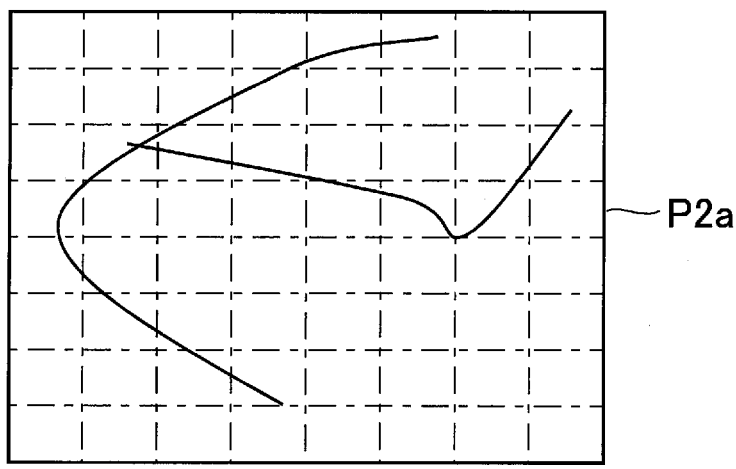

FIGS. 16A and 16B illustrate areas in which a fifth vein characteristic amount is calculated. FIG. 16A indicates a first division pattern. FIG. 16B indicates a second division pattern.

A fifth vein characteristic amount V5 is the amounts of veins included in a vein data, and is used as an index. A vein image is divided into some areas and a vein amount is calculated in each area. In this case, a first division pattern P1a for dividing a vein image into 49 (=7×7) areas and a second division pattern P2a for dividing a vein image into 64 (=8×8) areas are prepared.

A vein amount indicates that veins are dense or sparse in each area. Accordingly, a vein amount is calculated by counting the number of pixels included in a vein image in each area. A vein amount is calculated in all the 49 areas obtained by dividing the vein image on the basis of the first division pattern P1a and all the 64 areas obtained by dividing the vein image on the basis of the second division pattern P2a, and a histogram (seghist1[n]) is drawn. The histogram (seghist1[n]) is used as an index preIndex5. For example, an index of a vein amount for all the areas obtained by dividing the vein image on the basis of the first division pattern P1a is given by $$preIndex5\_1[49]=\{seghist1[0], seghist1[1], \ldots, seghist1[48]\} \qquad (30)$$

The sum total (Allcnt1) of preIndex5_1 [n] (n=0 to 48) is then found from the index preIndex5 obtained in this way. Each component is divided by the sum total to calculate a percentage. By doing so, normalization is performed.

For example, an index indicative of vein amount components for the 49 areas obtained by dividing the vein image on the basis of the first division pattern P1a is normalized by $$Index5\_P1a[49]=preIndex5\_1[0]/Allcnt1, preIndex5\_1[1]/Allcnt1, \ldots, preIndex5\_1[48]/Allcnt1 \qquad (31)$$

A histogram of vein amounts in all the 64 areas obtained by dividing the vein image on the basis of the second division pattern P2a is drawn. This is the same with the first division pattern P1a. It is assumed that the sum total of an index preIndex5_2 [n] (n=0 to 63) indicative of a vein amount in each of the 64 areas is Allcnt2. Normalization is performed by $$Index5\_P2a[64]=preIndex5\_2[0]/Allcnt2, preIndex5\_2[1]/Allcnt2, \ldots, preIndex5\_2[63]/Allcnt2 \qquad (32)$$

The five kinds of vein characteristic amounts calculated in the above ways are stored in the vein database 3 at the time of the vein data registration process and are used as comparison data at the time of the vein data identification process for making a comparison with registered data. Score calculation for a vein characteristic amount and a comparison order determination process performed in the vein data identification process will now be described.

(Score Calculation for Vein Characteristic Amount)

When the first through fifth vein characteristic amounts V1 through V5 are calculated as comparison data, characteristic amounts in all registered records are acquired from the vein database 3 and scores for determining degrees of similarity between the first through fifth vein characteristic amounts V1 through V5 and the acquired characteristic amounts are calculated.

A score regarding a vein characteristic amount is calculated as the sum total of the absolute value of the difference between registered data in each record and comparison data. That is to say, a score regarding the first vein characteristic amount V1 is calculated by $$\begin{aligned} score1 = &|\text{registered Index1}[0] - \text{comparison Index1}[0]| + \\ &|\text{registered Index1}[1] - \text{comparison Index1}[1]| + \\ &\vdots \\ &|\text{registered Index1}[35] - \text{comparison Index1}[35]| \end{aligned} \qquad (33)$$

A score regarding the second vein characteristic amount V2 is calculated by $$\begin{aligned} score2 = &|\text{registered Index2}[0] - \text{comparison Index2}[0]| + \\ &|\text{registered Index2}[1] - \text{comparison Index2}[1]| + \\ &\vdots \\ &|\text{registered Index2}[35] - \text{comparison Index2}[35]| \end{aligned} \qquad (34)$$

A score regarding the third vein characteristic amount V3 (based on the first division pattern P1) is calculated by $$\begin{aligned} score3\_P1 = \\ &|\text{registered Index3\_P1}[0][0] - \text{comparison Index3\_P1}[0][0]| + \\ &|\text{registered Index3\_P1}[0][2] - \text{comparison Index3\_P1}[0][2]| + \\ &\vdots \\ &|\text{registered Index3\_P1}[0][35] - \text{comparison Index3\_P1}[0][35]| \end{aligned} \qquad (35)$$

A score regarding the third vein characteristic amount V3 (based on the second division pattern P2) is calculated by $$\text{score3\_P2} = \tag{36}$$
$$|\text{registered Index3\_P2}[0][0] - \text{comparison Index3\_P2}[0][0]| +$$
$$|\text{registered Index3\_P2}[0][2] - \text{comparison Index3\_P2}[0][2]| +$$
$$\vdots$$
$$|\text{registered Index3\_P2}[0][35] - \text{comparison Index3\_P2}[0][35]|$$

Similarly, a score score4_P1 regarding the fourth vein characteristic amount V4 (based on the first division pattern P1), a score score4_P2 regarding the fourth vein characteristic amount V4 (based on the second division pattern P2), a score score5_P1a regarding the fifth vein characteristic amount V5 (based on the first division pattern P1a), and a score score5_P2 regarding the fifth vein characteristic amount V5 (based on the second division pattern P2a) are calculated. This calculation of a score regarding a vein characteristic amount is made for all registered records.

(Comparison Order Determination Process)

A score regarding a vein characteristic amount calculated in the above way is then used for calculating a total score for each record. A total score total[N] (N is a record number) is calculated by $$\text{total}[N] = \alpha \cdot \text{score1} + \beta \cdot \text{score2} + \gamma \cdot (\text{score3\_P1} + \text{score3\_P2}) + \tag{37}$$
$$\delta \cdot (\text{score4\_P1} + \text{score4\_P2}) + \varepsilon \cdot (\text{score5\_P1}a + \text{score5\_P2}a)$$

where $\alpha$, $\beta$, $\gamma$, $\delta$, and $\varepsilon$ are weighting factors.

If registration is performed plural times in the vein data registration process, a total score is calculated for each of captured images and total scores for the captured images are added together.

Total scores total[N] calculated in this way are sorted in descending order. The sort result is comparison order. When a comparison process is performed, comparison is made in accordance with this comparison order.

An example in which a one-to-N identification process is performed by applying the technique used in the above comparison order determination process will now be described.

Figure 17:
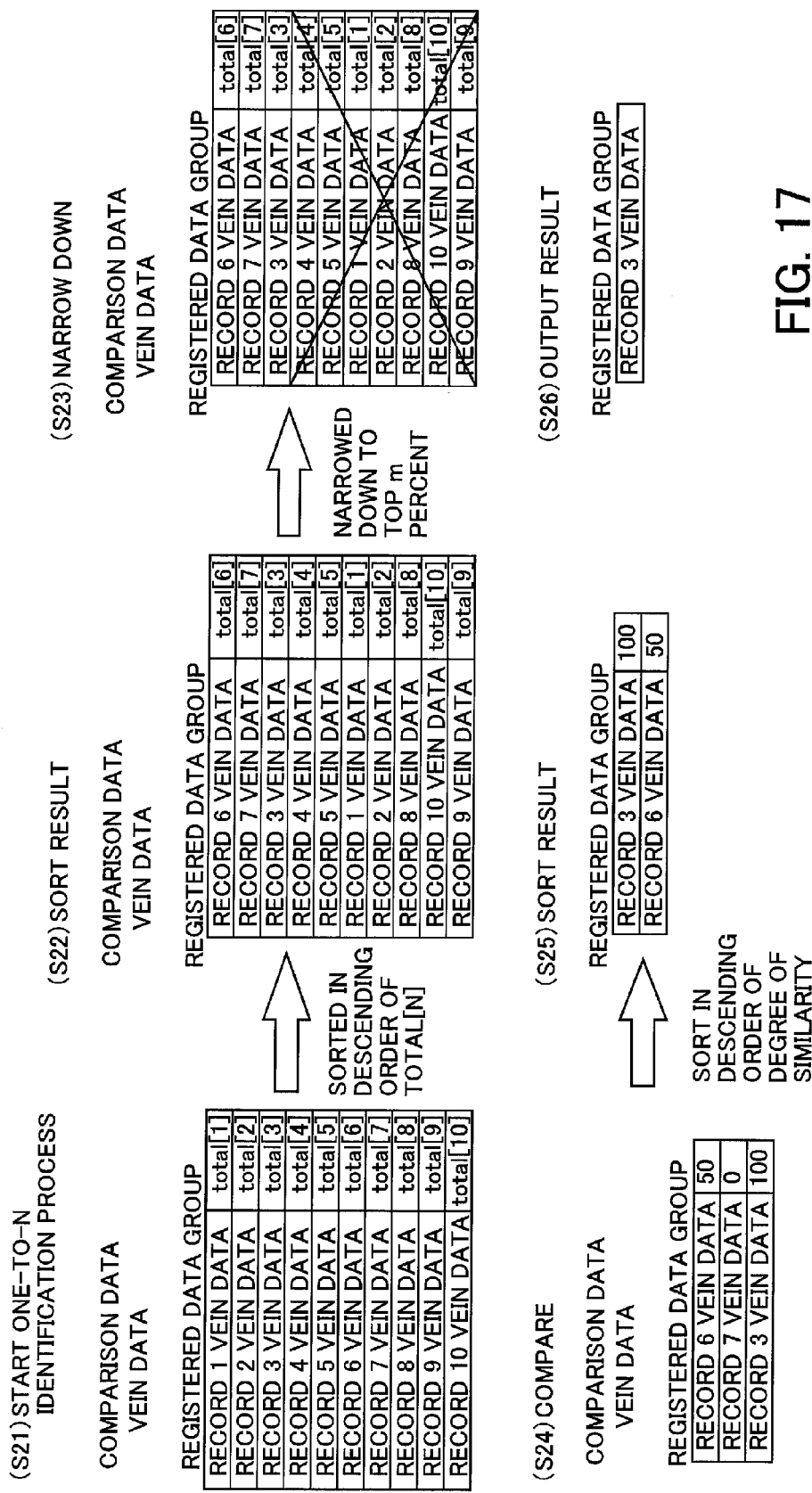
FIG. 17 is a view for describing the flow of a one-to-N identification process.

FIG. 17 is a view for describing the flow of a one-to-N identification process.

After total scores for all records are calculated, a one-to-N identification process is begun (S21). First all the records are sorted in descending order of total score (S22). As a result, all the records are rearranged in descending order of total score.

In this case, comparison data is compared not with all registered data but with records in the top m percent of all the records rearranged in descending order of total score (S23). In the example of FIG. 17, all the records are narrowed down to three.

In a comparison process vein data which is comparison data is compared with vein data included in the three records to which all the records are narrowed down (S24). At this time degrees of similarity between the comparison data and a registered data group is calculated. Authentication succeeds for a record for which a degree of similarity is greater than a determined value. In the example of FIG. 17, a degree of similarity for a "record 7" is "0", so authentication fails.

Records for which authentication succeeds are then sorted in descending order of degree of similarity (S25). As a result, a user identification number (ID) of a record for which a degree of similarity is the highest is outputted as a result of the comparison process and is recorded in, for example, an entering and leaving log file, along with a date and time.

As has been described, the five kinds of vein characteristic amounts are used in vein characteristic amount calculation as a preparation for a vein data comparison process. This increases the accuracy of characteristic amounts. Accordingly, when records are sorted on the basis of the characteristic amounts, the probability that a record for which a degree of similarity is high will rank high becomes large. As a result, when records are narrowed down, the percentage of records which are treated as objects of comparison can be decreased. With the biometrics authentication apparatus which is described in "BACKGROUND" and which uses three kinds of vein characteristic amounts, for example, records are narrowed down to the top 30 percent. In this embodiment, however, records can be narrowed down to the top 6 percent. As a result, the number of records which are objects of comparison decreases, so a comparison process can be performed at a higher speed. This means that the maximum number of pieces of vein data which can be registered can be increased significantly. In addition, five kinds of eight pieces of data are used as vein characteristic amounts. However, the amount of each piece of data is significantly small compared with the amount of data included in records used in a comparison process, so time taken to perform the processes from the vein characteristic amount calculation to the comparison order determination process does not become long.

Figure 18:
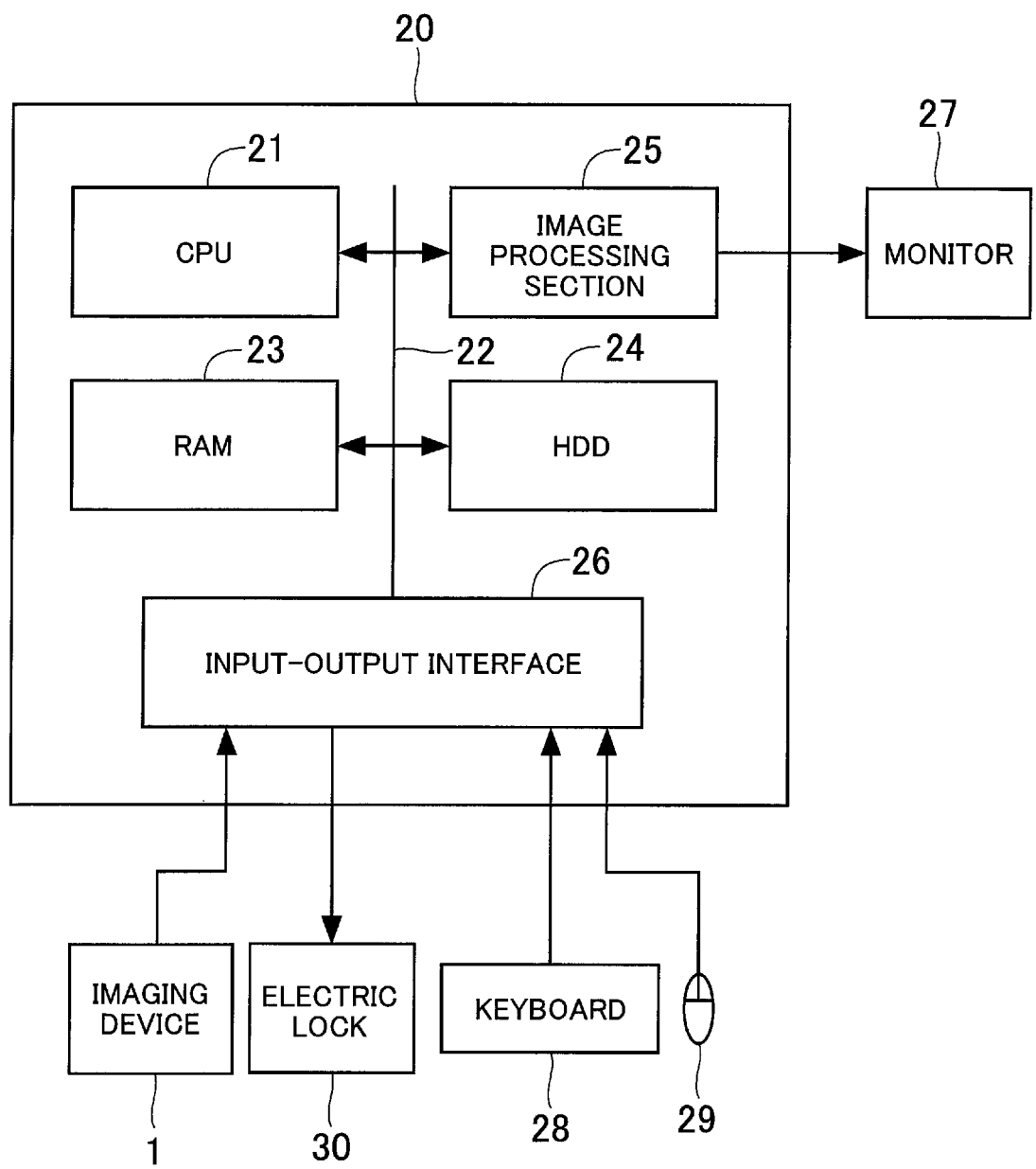
FIG. 18 is an example of the hardware configuration of a computer which realizes the vein data registration process and the vein data identification process.

FIG. 18 is an example of the hardware configuration of a computer which realizes the vein data registration process and the vein data identification process.

A computer 20 includes a CPU (Central Processing Unit) 21 which controls the whole of the computer 20. The CPU 21 is connected to a RAM (Random Access Memory) 23, an HDD (Hard Disk Drive) 24, an image processing section 25, and an input-output interface 26 via a bus 22.

The RAM 23 temporarily stores at least a part of an OS (Operating System) or an application program executed by the CPU 21. The RAM 23 also stores various pieces of data and various parameters which the CPU 21 needs to perform a process. The HDD 24 stores the OS and an application program for performing an authentication process.

A monitor 27 is connected to the image processing section 25. In accordance with instructions from the CPU 21, the image processing unit 25 displays an image on a screen of the monitor 27. A keyboard 28, a mouse 29, an electric lock 30, and the imaging device 1 are connected to the input-output interface 26. A signal outputted from the keyboard 28 or the mouse 29 is received by the input-output interface 26 and is transmitted to the CPU 21 via the bus 22. A signal indicative of a captured image of palm veins outputted from the imaging device 1 is received by the input-output interface 26 and is transferred to the RAM 23 or the HDD 24 via the bus 22. The electric lock 30 is fitted on a door. A result of the execution of the application program for performing an authentication process is received via the input-output interface 26. The electric lock 30 is shut or opened according to whether or not personal authentication succeeds.

By adopting the above hardware configuration, the function of a one-to-N identification process according to this embodiment can be realized.

With the above living body information registration method, biometrics authentication method, and biometrics authentication apparatus the accuracy of the characteristic amounts is increased. As a result, in spite of unstable vein data specific to a living body, stable vein characteristic amounts can be calculated. By classifying registered data on the basis of the vein characteristic amounts, an increase in the speed of one-to-N comparison and the maximum number of persons which can be registered can be expected in a biometrics authentication system such as a palm vein authentication apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A living body information registration method executed by a computer, the method comprising:

extracting vein data and characteristic amounts from a captured image which is living body information; and registering the extracted vein data and the extracted characteristic amounts, the characteristic amounts including:

a first vein characteristic amount which is a frequency component obtained by characterizing periodicity of veins by performing a Fourier transform on a vein image obtained by reducing the vein data;

a second vein characteristic amount which is an angle component obtained by characterizing a direction of a vein by performing a Fourier transform on the vein image;

a third vein characteristic amount which is a curvature direction component obtained by characterizing a direction of a curvature of a vein of the vein image;

a fourth vein characteristic amount which is a segment direction component obtained by characterizing a direction of a vein segment obtained by dividing a vein of the vein image; and a fifth vein characteristic amount which is a vein amount obtained by characterizing an amount of veins included in the vein image, wherein the fourth vein characteristic amount indicates distribution of segment direction components obtained by:

dividing the vein image into a plurality of areas in accordance with a first division pattern;

for each area, vectorizing the vein image, finding a vein segment made up of straight segments bent at vector points, calculating a slope of each segment, and drawing a histogram;

dividing the vein image into a plurality of areas in accordance with a second division pattern that specifies different division positions from the first division pattern; and for each area obtained under the second division pattern, vectorizing the vein image, finding a vein segment made up of straight segments bent at vector points, calculating a slope of each segment, and drawing a histogram, and wherein the fifth vein characteristic amount indicates a distribution of vein amounts obtained by:

dividing the vein image into a plurality of areas in accordance with the first division pattern;

for each area, calculating the number of pixels corresponding to the veins included in the vein image and drawing a histogram;

dividing the vein image into a plurality of areas in accordance with the second division pattern; and for each area obtained under the second division pattern, calculating the number of pixels corresponding to the veins included in the vein image and drawing a histogram.

2. A biometrics authentication method executed by a computer, the method comprising:

extracting vein data and characteristic amounts from a captured image which is living body information;

acquiring registered vein data and registered characteristic amounts in each record registered in advance;

calculating scores indicative of rough degrees of similarity from the extracted characteristic amounts and the acquired registered characteristic amounts;

determining comparison order from a result of sorting the scores; and comparing the vein data with the registered vein data in accordance with the determined comparison order, the characteristic amounts and the registered characteristic amounts including:

a first vein characteristic amount which is a frequency component obtained by characterizing periodicity of veins by performing a Fourier transform on a vein image obtained by reducing the vein data;

a second vein characteristic amount which is an angle component obtained by characterizing a direction of a vein by performing a Fourier transform on the vein image;

a third vein characteristic amount which is a curvature direction component obtained by characterizing a direction of a curvature of a vein of the vein image;

a fourth vein characteristic amount which is a segment direction component obtained by characterizing a direction of a vein segment obtained by dividing a vein of the vein image; and a fifth vein characteristic amount which is a vein amount obtained by characterizing an amount of veins included in the vein image, wherein the fourth vein characteristic amount indicates distribution of segment direction components obtained by:

dividing the vein image into a plurality of areas in accordance with a first division pattern;

for each area, vectorizing the vein image, finding a vein segment made up of straight segments bent at vector points, calculating a slope of each segment, and drawing a histogram;

dividing the vein image into a plurality of areas in accordance with a second division pattern that specifies different division positions from the first division pattern; and for each area obtained under the second division pattern, vectorizing the vein image, finding a vein segment made up of straight segments bent at vector points, calculating a slope of each segment, and drawing a histogram, and wherein the fifth vein characteristic amount indicates a distribution of vein amounts obtained by:

dividing the vein image into a plurality of areas in accordance with the first division pattern;

for each area, calculating the number of pixels corresponding to the veins included in the vein image and drawing a histogram;

dividing the vein image into a plurality of areas in accordance with the second division pattern; and for each area obtained under the second division pattern, calculating the number of pixels corresponding to the veins included in the vein image and drawing a histogram.

3. The biometrics authentication method according to claim 2, wherein the scores are total scores obtained by calculating a sum total of differences between the extracted characteristic amounts and the acquired registered characteristic amounts for each of the first through fifth vein characteristic amounts and calculating a sum total of the sum totals for the first through fifth vein characteristic amounts.

4. The biometrics authentication method according to claim 3, wherein the comparison order is determined by sorting the records registered in advance by the total scores.

5. The biometrics authentication method according to claim 2, wherein the vein data is compared with a part of the registered vein data which ranks high in the comparison order determined from the result of sorting the scores.

6. The biometrics authentication method according to claim 2, wherein records for which degrees of similarity are greater than or equal to a determined value are sorted by the degrees of similarity and the determination that a record which ranks highest is a record for a user whose veins are image-captured is made.

7. The biometrics authentication method according to claim 2, wherein the first vein characteristic amount is a frequency component indicative of the periodicity of the veins which is obtained by finding a spatial frequency component by performing a two-dimensional fast Fourier transform on the vein image, calculating a power spectrum from the spatial frequency component, expressing the power spectrum in polar coordinates, and finding energy in a doughnut-shaped area a center of which is an origin.

8. The biometrics authentication method according to claim 2, wherein the second vein characteristic amount is a direction component which indicates the direction in which the vein extends and which is obtained by finding a spatial frequency component by performing a two-dimensional fast Fourier transform on the vein image, calculating a power spectrum from the spatial frequency component, expressing the power spectrum in polar coordinates, and finding energy in a determined angle range.

9. The biometrics authentication method according to claim 2, wherein the third vein characteristic amount is a segment curvature direction component obtained by vectorizing the vein image, finding a vein segment made up of straight segments bent at vector points, calculating a curvature direction for two adjacent segments both ends of which are vector points that are a certain distance away from each other, and drawing a histogram.

10. The biometrics authentication method according to claim 9, wherein:
the vein image is divided into a plurality of areas in accordance with two division patterns which differ in division position; and
the histogram is drawn for each area.

11. A biometrics authentication apparatus for authenticating a user by living body information, the apparatus comprising:
an imaging device configured to capture an image of the user's veins;
a vein database configured to store vein data and characteristic amounts included in the image which is the living body information and which is captured by the imaging device as registered vein data and registered characteristic amounts; and
one or more processors configured to perform a procedure comprising:
extracting the vein data and the characteristic amounts from the image, the characteristic amounts including:
a first vein characteristic amount which is a frequency component obtained by characterizing periodicity of veins by performing a Fourier transform on a vein image obtained by reducing the vein data;
a second vein characteristic amount which is an angle component obtained by characterizing a direction of a vein by performing a Fourier transform on the vein image;
a third vein characteristic amount which is a curvature direction component obtained by characterizing a direction of a curvature of a vein of the vein image;
a fourth vein characteristic amount which is a segment direction component obtained by characterizing a direction of a vein segment obtained by dividing a vein of the vein image; and
a fifth vein characteristic amount which is a vein amount obtained by characterizing an amount of veins included in the vein image;
registering the extracted vein data and the extracted characteristic amounts in the vein database as the registered vein data and the registered characteristic amounts;
acquiring the registered vein data and the registered characteristic amounts from the vein database;
calculating scores indicative of rough degrees of similarity from the extracted characteristic amounts and the registered characteristic amounts acquired, and determining comparison order from a result of sorting the scores; and
comparing the extracted vein data with the registered vein data acquired in accordance with the determined comparison order,
wherein the fourth vein characteristic amount indicates distribution of segment direction components obtained by:
dividing the vein image into a plurality of areas in accordance with a first division pattern;
for each area, vectorizing the vein image, finding a vein segment made up of straight segments bent at vector points, calculating a slope of each segment, and drawing a histogram;
dividing the vein image into a plurality of areas in accordance with a second division pattern that specifies different division positions from the first division pattern and
for each area obtained under the second division pattern, vectorizing the vein image, finding a vein segment made up of straight segments bent at vector points, calculating a slope of each segment, and drawing a histogram, and
wherein the fifth vein characteristic amount indicates a distribution of vein amounts obtained by:
dividing the vein image into a plurality of areas in accordance with the first division pattern;
for each area, calculating the number of pixels corresponding to the veins included in the vein image and drawing a histogram;
dividing the vein image into a plurality of areas in accordance with the second division pattern; and
for each area obtained under the second division pattern, calculating the number of pixels corresponding to the veins included in the vein image and drawing a histogram.

* * * * *